United States Patent Office 3,297,771
Patented Jan. 10, 1967

3,297,771
TRICHLOROMETHYLATION OF CHLORO-
SUBSTITUTED BENZENES
John R. Leebrick, Roselle Park, and Hugh E. Ramsden,
Scotch Plains, N.J., assignors, by mesne assignments, to
M & T Chemicals Inc., New York, N.Y., a corporation
of Delaware
No Drawing. Filed Jan. 13, 1959, Ser. No. 786,458
7 Claims. (Cl. 260—651)

The present invention relates to the preparation of trichloromethylbenzene compounds and of benzoic acids derivable therefrom. More particularly, the invention relates to a process for preparing trichloromethyl derivatives of tri- and tetra-substituted benzene compounds, and tri- and tetra-substituted benzoic acids.

We have discovered a new way of obtaining tetra- and penta-substituted benzene compounds wherein one of the substituent groups is a trichloromethyl group. Through hydrolysis of the trichloromethyl group, a convenient route to the preparation of tri- and tetra-substituted benzoic acids is provided.

An object of the present invention is to provide a method of preparing trichloromethylbenzene compounds.

It is also an object of the present invention to provide a method of preparing tri- and tetra-substituted benzoic acids.

Other objects will be apparent to those skilled in the art upon reading the following disclosure of our invention.

Generally speaking, the process contemplated by the present invention comprises reacting tri- and tetra-substituted benzene compounds with carbon tetrachloride in the presence of a Friedel-Crafts type catalyst such as aluminum chloride, and separating the trichloromethylated product which forms therefrom. In order that the desired trichloromethylbenzene compounds be obtained in the present process, it is required that the benzene compounds employed as reactants be tri- or tetra-substituted benzene compounds. It is also required that the substituents of the tri- and tetra-substituted benzene compounds be unreactive with carbon tetrachloride in the presence of the Friedel-Crafts type catalyst. Suitable substituents include chlorine atoms, such as in 1,2,4-trichloro- and 1,2,3,4-tetrachlorobenzenes, lower alkyl groups such as methyl, ethyl, propyl, butyl, etc. and lower dialkylamino groups such as dimethylamino, diethylamino, dipropylamino, methylethylamino, methylbutylamino, etc. Tri- and tetra-substituted benzene compounds in which the substituents are different, such as in methyldichloro-, dimethylchloro-, methyltrichloro-, dimethylaminodichloro-, dimethylaminodimethyl-, dimethylaminoethyldichlorobenzene, etc. are also suitable reactants.

The presence of a Friedel-Crafts catalyst in the reaction mixture is required. Probably the best known catalysts of this type which are suitable catalysts in the present process, are the aluminum halides, e.g., aluminum bromide and aluminum chloride. Aluminum chloride is the preferred catalyst because it exhibits strong activity and is inexpensive. The invention contemplates the use, however, of equivalent Friedel-Crafts type catalysts of similarly strong activity. As will be apparent to those skilled in the art, the quantity of Friedel-Crafts type catalytic material employed in the present process is not critical. Generally, the quantity of such material employed is between about 10 and 100 parts by weight per 100 parts of the substituted benzene compound employed, the exact quantity to be prefered being dependent on reaction conditions such as temperature, degree of dilution of reactants, degree of agitation, activity of the catalyst material, etc.

The reaction is generally accomplished at the refluxing temperature of the reaction mixture, although both lower and higher temperatures may be employed to advantage in certain instances. The preferred temperature is the refluxing temperature of the reaction mixture since such temperatures are easily maintained, and at the reflux temperatures the reaction proceeds smoothly to yield the desired trichloromethylbenzene compounds.

In order to regulate reaction temperature, obtain uniform contact of catalyst with reactants, control reaction velocity, etc., it is desirable to employ a diluent or solvent in the reaction mixture. It is preferred in the present process to use an excess of carbon tetrachloride as a diluent or solvent since undesirable side-products derivable from a solvent foreign to the reaction are eliminated in this way. Other solvents unreactive with the reactants and reaction products of the present process may, however, be utilized as diluents or solvents for the reaction mixture.

Since hydrogen chloride gas is formed during the course of the reaction, it is preferred that the reaction mixture be vigorously and uniformly agitated. This assures the smooth evolution of hydrogen chloride gas, and also provides uniform contact of the reactants with the Friedel-Crafts material when it is in solid form.

The manner of carrying out the process of the present invention is further illustrated by the following examples.

*Example 1.—2,3,4,5-tetrachloro(trichloromethyl)benzene
and 2,3,4,5-tetrachlorobenzoic acid*

Twenty grams of aluminum chloride and 100 ml. of carbon tetrachloride were charged into a flask equipped with a stirrer, thermometer, addition funnel and a gas exit tube. The mixture was heated to reflux, and a solution of 20 g. of 1,2,3,4-tetrachlorobenzene in 60 ml. of $CCl_4$ was added to the reaction flask over a period of 30 minutes. After the mixture had refluxed for an additional hour, it was poured over crushed ice. The aqueous layer was separated from the organic layer, and washed with additional $CCl_4$. The organic layers were combined, and excess solvent was removed by distillation at reduced pressure. A 55% yield of 2,3,4,5-tetrachloro(trichloromethyl)benzene crystallized from the remaining $CCl_4$ upon cooling.

Five grams of the crystals were treated with hot aqueous zinc chloride, washed to remove the zinc chloride, extracted with base, and the basic solution then filtered. Acidification gave a solid acid melting at 185° C. (lit. for 2,3,4,5-tetrachlorobenzoic acid, 186° C.).

*Example 2.—2,3,5-trichloro(trichloromethyl)benzene
and 2,3,5-trichlorobenzoic acid*

Following the procedure of Example 1, 108 g. of $AlCl_3$, 120 g. of 1,2,4-trichlorobenzene, and 400 ml. of $CCl_4$ were reacted to give 128 g. of product containing two solid components, M.P. 72–74° and 179–180° C., respectively. The lower melting component was treated with zinc chloride-water to yield an acid melting at 164° C. (lit. for 2,3,5-trichlorobenzoic acid, 163° C.).

*Example 3.—2,4,6-trichloro(trichloromethyl)benzene
and 2,4,6-trichlorobenzoic acid*

Reaction of 1,3,5-trichlorobenzene (36 g.) with 27 g. of $AlCl_3$ and 150 ml. of $CCl_4$ as described in Example 1 gave 39 g. of an oil, B.P. 135–137° C./4 mm. The oil analyzed for a trichloromethyltrichlorobenzene. Hydrolysis with concentrated sulfuric acid gave an acid having a neutral equivalent in good agreement with theory for a trichlorobenzoic acid.

*Example 4.—2,3,4,6-tetrachloro(trichloromethyl)benzene*

Following the procedure of Example 1, 1,2,3,5-tetrachlorobenzene is reacted with excess carbon tetrachloride in the presence of aluminum bromide to obtain 2,3,4,6-tetrachloro(trichloromethyl)benzene.

*Example 5.—2,3,5-trimethyl(trichloromethyl)benzene and 2,3,5-trimethylbenzoic acid.*

By replacing the 1,2,4-trichlorobenzene in Example 2 with pseudocumene, 2,3,5-trimethyl(trichloromethyl)benzene is obtained. Hydrolysis of the trichloromethyl group yields the corresponding trimethylbenzoic acid.

*Example 6.—2,3,4,5-tetramethyl(trichloromethyl) benzene and 2,3,4,5-tetramethylbenzoic acid*

By replacing the 1,2,3,4-tetrachlorobenzene of Example 1 with prehnitene, 2,3,4,5-tetramethyl(trichloromethyl) benzene is obtained, and by hydrolysis of this product, 2,3,4,5-tetramethylbenzoic acid is isolated.

*Example 7.—2-methyl-4,6-diethyl(trichloromethyl)benzene*

By the procedure of Example 1, 3,5-diethyltoluene is reacted with carbon tetrachloride to obtain 2-methyl-4,6-diethyl(trichloromethyl)benzene.

*Example 8.—3-dimethylamino-2,4,6-trimethyl(trichloromethyl)benzene*

By the procedure of Example 1, N,N-dimethylmesidine is reacted with carbon tetrachloride to obtain 3-dimethylamino-2,4,6-trimethyl(trichloromethyl)benzene.

*Example 9.—2,3,5-tri(dimethylamino)(trichloromethyl) benzene*

By the procedure of Example 1, 1,2,4-tri(dimethylamino)benzene is reacted wtih carbon tetrachloride to obtain 2,3,5-tri-(dimethylamino)(trichloromethyl)benzene.

*Example 10.—2-methyl-3,5-dichloro(trichloromethyl) benzene*

By the procedure of Example 1, 2,4-dichlorotoluene is reacted with carbon tetrachloride to obtain 2-methyl-3,5-dichloro(trichloromethyl)benzene.

*Example 11.—2(diethylamino)-3,4,5-trichloro(trichloromethyl)benzene*

By the procedure of Example 1, 2,3,4-trichloro-N,N-diethylaniline is reacted with carbon tetrachloride to obtain 2-(diethylamino)-3,4,5-trichloro(trichloromethyl) benzene.

As is evident from the foregoing discussion and examples, the tri- and tetra-substituted trichloromethylbenzene compounds are readily preparable by the present process from relatively inexpensive materials. Heretofore, their preparation has generally been accomplished by the chlorination of correspondingly substituted methylbenzene compounds. However, the replacement of the hydrogen atoms of the methyl group by chlorine is generally attended with the concomitant formation of other chlorinated products which are exceedingly difficult and costly to separate from the desired trichloromethyl product. The present invention provides the desired products without the concomitant formation of difficultly separable side-products. By a simple hydrolysis process, the trichloromethylbenzene compounds are hydrolyzed to the corresponding benzoic acids. The trichloromethylbenzene compounds are themselves useful as secondary cleaning solvents, while the substituted benzoic acids are useful as herbicides, insecticides and fire-retarding agents.

As many embodiments of this invention may be made without departing from the spirit and scope thereof, it is to be understood that the invention includes all such modifications and variations as come within the scope of the appended claims.

We claim:
1. A process which comprises reacting carbon tetrachloride with a member selected from the class consisting of 1,2,4-, 1,3,5-, 1,2,3,4-, and 1,2,3,5-chloro substituted benzenes in the presence of a catalyst selected from the class consisting of aluminum chloride and aluminum bromide to produce a product wherein a nuclear hydrogen atom of the substituted benzene reactant is replaced by a trichloromethyl radical.

2. A process according to claim 1 wherein the catalyst is aluminum chloride.

3. A process according to claim 2 wherein the reaction is carried out at the reflux temperature of the reaction mixture.

4. A process according to claim 3 wherein the substituted benzene reactant is 1,2,4-trichlorobenzene.

5. A process according to claim 3 wherein the substituted benzene reactant is 1,3,5-trichlorobenzene.

6. A process according to claim 3 wherein the substituted benzene reactant is 1,2,3,4-tetrachlorobenzene.

7. A process according to claim 3 wherein the substituted benzene reactant is 1,2,3,5-tetrachlorobenzene.

References Cited by the Examiner
UNITED STATES PATENTS

| | | | |
|---|---|---|---|
| 1,557,153 | 10/1925 | George | 260—515 |
| 1,878,462 | 9/1932 | Britton | 260—651 X |
| 1,878,463 | 9/1932 | Britton | 260—515 |
| 3,187,057 | 6/1965 | Peter et al. | 260—651 |

OTHER REFERENCES

Thomas, "Anhydrous Aluminum Chloride in Organic Chemistry," pp. 174–178 (1941).

Wagner et al.: "Synthetic Organic Chemistry," pp. 108–9 and 418 (1953).

Holleman, "Trav. Chim. Pays-Bas," vol. 31, pp. 267–280 (1912).

LEON ZITVER, *Primary Examiner.*

A. M. BOETTCHER, A. S. SULLIVAN, *Examiners.*

M. C. STAVES, J. W. WILLIAMS, K. H. JOHNSON, K. V. ROCKEY, *Assistant Examiners.*